(12) United States Patent
Lin et al.

(10) Patent No.: US 7,292,390 B2
(45) Date of Patent: Nov. 6, 2007

(54) FIBER-COUPLED MULTIPLEXED CONFOCAL MICROSCOPE

(75) Inventors: Charles P. Lin, Arlington, MA (US); Robert H. Webb, Lincoln, MA (US)

(73) Assignee: The General Hospital Corporation, Boston, MA (US)

( * ) Notice: Subject to any disclaimer, the term of this patent is extended or adjusted under 35 U.S.C. 154(b) by 0 days.

(21) Appl. No.: 10/830,905

(22) Filed: Apr. 22, 2004

(65) Prior Publication Data
US 2004/0264897 A1 Dec. 30, 2004

Related U.S. Application Data

(62) Division of application No. 09/885,576, filed on Jun. 20, 2001, now Pat. No. 6,747,795.

(60) Provisional application No. 60/215,154, filed on Jun. 30, 2000.

(51) Int. Cl.
*G02B 21/06* (2006.01)
(52) U.S. Cl. .................. 359/385; 385/116; 600/182
(58) Field of Classification Search ............ 385/31–32, 385/147, 115–117, 119–120; 359/368, 385; 356/73.1; 396/267; 600/101, 160, 182
See application file for complete search history.

(56) References Cited
U.S. PATENT DOCUMENTS
4,762,391 A * 8/1988 Margolin ................. 385/119

| | | |
|---|---|---|
| 4,806,004 A | 2/1989 | Wayland |
| 5,120,953 A | 6/1992 | Harris |
| 5,122,653 A | 6/1992 | Ohki |
| 5,304,173 A | 4/1994 | Kittrell et al. |
| 5,323,009 A | 6/1994 | Harris |

(Continued)

FOREIGN PATENT DOCUMENTS
WO    WO99/44089    9/1999

(Continued)

OTHER PUBLICATIONS
U.S. Appl. No. 60/172,436, filed Dec. 17, 1999, Macaulay et al.*

(Continued)

*Primary Examiner*—Stephone B. Allen
*Assistant Examiner*—Lee Fineman
(74) *Attorney, Agent, or Firm*—Edwards Angell Palmer & Dodge LLP; Peter C. Lauro, Esq.; George N. Chaelas, Esq.

(57) ABSTRACT

A confocal microscope system that is inherently fiberoptic compatible is described which has line scanning aided image formation. An incoherent fiberoptic bundle maps a line illumination pattern into a dispersible group of separate sources, and then remaps this confocally selected remitted light to the original line. Fibers, not confocal with the illumination, carry light to be rejected from the image back on itself upon double passing, while separate fibers carry light from non-confocal sample planes. The transformation allows efficient rejection of unwanted photons at a slit aperture. The fiber bundle and an objective lens provide a flexible probe for imaging internal tissue for pathological examination on a cellular level.

14 Claims, 6 Drawing Sheets

U.S. PATENT DOCUMENTS

| | | | |
|---|---|---|---|
| 5,450,203 | A | 9/1995 | Penkethman |
| 5,785,651 | A | 7/1998 | Kuhn et al. |
| 5,923,466 | A * | 7/1999 | Krause et al. ............. 359/389 |
| 6,121,603 | A | 9/2000 | Hang et al. |
| 6,370,422 | B1 | 4/2002 | Richards-Kortum et al. |
| 6,663,560 | B2 | 12/2003 | MacAulay et al. |

FOREIGN PATENT DOCUMENTS

WO      WO99/47041      9/1999

OTHER PUBLICATIONS

A.F. Gmitro and D. Azia, Confocal Microscopy Through a Fiber-optic Imaging Bundle, Opt. Lett., vol. 18, No. 8, 565-567 (1993).

Y.S. Sabharwal, A.R. Rouse, I. Donaldson, M.F. Hopkins, and A.F. Gmitro, Slit-scanning Confocal Microendoscope For High-resolution in vivo Imaging, Appl. Opt., vol. 38, No. 34, 7133-7144 (1999).

G.Q. Xiao, T.R. Corle, and G.S. Kino, Real-time Confocal Scanning Optical Microscope, Appl. Phys. Lett., vol. 53, No. 8, 716-718 (1988).

A.H. Buist, M. Muller, J. Squier, and G.J. Brakenhoff, Real Time Two-photon Absorption Microscopy Using Multi Point Excitation, J. Microsc. (Oxford) Part 2, vol. 192, 217-226 (1998).

G.J. Tearney, R.H. Webb, and B.E. Bouma, Spectrally Encoded Confocal Microscopy, Opt. Lett., vol. 23, No. 15, 1152-1154 (1998).

C.J. Koester, J.D. Auran, H.D. Rosskothen, G.J. Florakis, R.B. Tackaberry, Clinical Microscopy of the Cornea Utilizing Optical Sectioning and a High-Numerical-Aperture Objective, J. Opt. Soc. Am. A, vol. 10, No. 7, 1670-1679 (1993).

G.J. Brakenhoff and K. Visscher, Confocal Imaging and Bilateral Scanning and Array Dectors, J. Microsc. (Oxford) Part 1, vol. 165, 139-146 (1992).

Lin, Charles P. and Webb, Robert H., *Fiber-coupled multiplexed confocal microscope*, Optics Letters, vol. 25, No. 13, Jul. 1, 2000.

D.R. Sandison and W.W. Webb, Background Rejection and Signal-to-noise Optimization in Confocal and Alternative Fluorescence Microscopes, Appl. Opt., vol. 33, No. 4, 603-615 (1994).

J. Bewersdorf, R. Pick, and S.W. Hell, Multifocal Multiphoton Microscopy, Opt., vol. 23, 655-659 (1998).

R. Juskkaitis and T. Wilson, Direct-view Fiber-optic Confocal Microscope, Opt. Lett., vol. 19, No. 22, 1906-1908 (1994).

P.M. Delaney, M.R. Harris and R.G. King, Fiber-optic Laser Scanning Confocal Microscope Suitable for Fluorescence Imaging, Appl. Opt., vol. 33, No. 4, 573-577 (1994).

D.L. Dickensheets and G.S. Kino, Micromachined Scanning Confocal Optical Microscope, Opt. Lett., vol. 21, No. 10, 764-766, (1996).

* cited by examiner

Dark circles represent illuminated fibers.

FIBER-COUPLED MULTIPLEXED CONFOCAL MICROSCOPE

This application is a division of application Ser. No. 09/885,576, filed Jun. 20, 2001, now U.S. Pat. No. 6,747,795. This application also claims the priority benefit of U.S. Provisional Application No. 60/215,154, filed Jun. 30, 2000. Each of these applications and each document cited or referenced in each of these applications, including during any prosecution ("application cited documents"), and each document cited or referenced in each of the application cited documents, are hereby incorporated herein by reference.

DESCRIPTION

The present invention relates to confocal microscopy, and relates particularly to confocal microscope having a parallel scanning system compatible with fiberoptics. The invention provides a remote probe for confocal imaging of tissue at locations within a body, such as commonly done with endoscopes, and thus the invention provides the advantages of confocal microscopy in biomedical applications by enabling access to distant and inconvenient regions.

The invention uses fiber optics, but in a way to provide significant improvement over confocal microscopes using fibers that have been reported, such as in which a single fiber serves as the source and the detector pinhole.

A line scanning confocal microscope with slit aperture detection can be regarded as a form of multifocal illumination and parallel detection, where all the foci line up in one direction. Image formation requires only slow scanning (at 25 or 30 Hz for video rate) in the second direction. This approach is particularly attractive because of its simplicity and high optical throughput. The major drawback of the line scanning approach is its relative poor rejection of unwanted photons compared to the pinhole system.

Briefly, the present invention provides a confocal microscope in which the region of interest (as for example a tissue ex-vivo, or in-vivo as inside a body cavity) is illuminated via a fiber optic bundle, where the spatial arrangement of fibers at one end of the bundle is different from that at the other end. Such a bundle is called an incoherent fiber optic bundle. A bundle in which the spatial arrangement of fibers is maintained is a coherent fiber bundle. The microscope may have means for scanning a laser beam from a slit providing an aperture in one direction across, as with a slit scanning microscope, but has true two-dimensional confocality because of encoding the slit with an incoherent fiber bundle. The incoherent bundle effectively multiplexes and demultiplexes the light, respectively, incident on and remitted from the region of interest. An important advantage of this microscope is that it can operate at the distal end of a fiber bundle and can therefore provide a probe on a flexible, small diameter member where it can be implemented on or as an endoscope or catheter.

It is a feature of the invention to provide an improved fiber optic confocal microscope where the fiber effects a parallel scanning mechanism that is inherently fiberoptic compatible and that retains the simplicity of the line scanning confocal microscope, while improving on its axial sectioning resolution. The improvement is provided by using an incoherent fiber bundle. In the bundle, the input and output fibers may be randomly arranged, although other, specific mapping can also be employed to obtain incoherent coupling via the fiber. A line source illuminates the proximal (P) end of the fiber bundle, which transforms the line input into disperse array of fibers at the distal (D) end, spread out over the whole bundle. This set of disperse spots is imaged onto the sample by an objective lens. Remitted light (fluorescence or back scattered) from the sample is collected and imaged by the same objective lens back onto the fiber endface (D), from a region in the sample being viewed, which is exactly in focus, the remitted light is imaged onto the same set of fibers which carried the illumination light, and transformed back into a line at (P). For an unwanted (or out-of-focus) sample plane, each illuminated fiber at D will produce, on the return, a smeared-out spot, which covers not just the original fiber but a group of surrounding fibers. For spots illuminated indirectly, such as by scattered light, the same is true. Back at Plane P, the fibers which carry the "smeared-out" photons do not reassemble into a line but are spread out dispersely over the bundle. A slit aperture, placed at a plane conjugate to P, allows only light (photons) from the in-focus plane, and intentionally illuminated spots, to pass through the detector, while rejecting most of the unwanted photons. The detector provides signals representing scan lines in the plane from which a 2-D image at that plane can be constructed.

The invention will become more apparent from a reading of the following specification in connection with the accompanying drawings which, briefly described, are as follows.

Figure 1A:
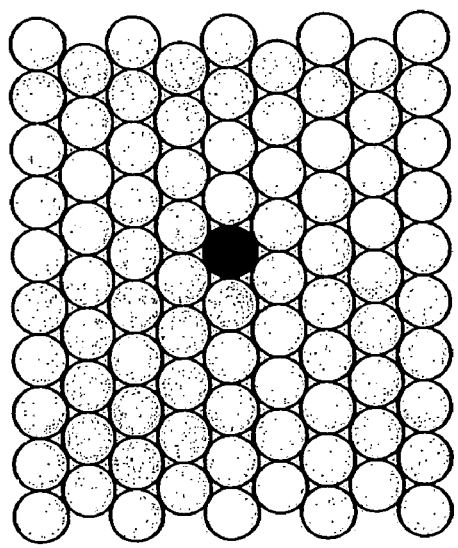
FIG. 1A is a view of an end of a fiber optic bundle which shows only a center fiber thereof that is illuminated.
Figure 1B:
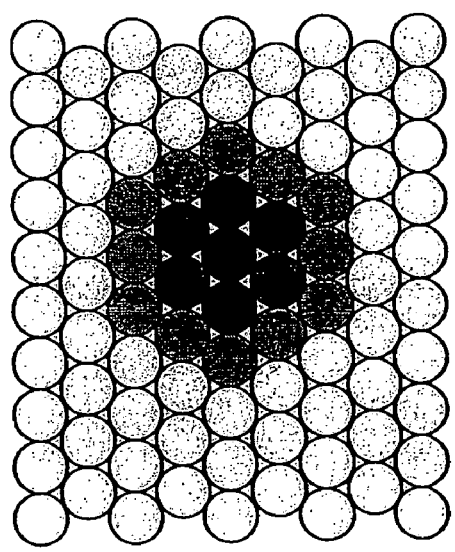
FIG. 1B is a view in a plane, D, across the distal end of the fiber optic bundle of FIG. 1A when that bundle represents a coherent fiber optic bundle.

Consider FIGS. 1A to 1D and that, for clarity, a single fiber at the center of the bundle is illuminated (FIG. 1A). Return light from a non-confocal point is collected by the objective lens and forms and extended spot at plane D, filling a group of fibers surrounding the central fiber (FIG. 1B). If the fiber bundle is coherent, this group of fibers will emerge at plane P with a similar pattern to that in FIG. 1B but surrounding the fiber of FIG. 1A. The planes P and D are at the proximal and distal ends of the bundle and are perpendicular to the optical axis (see FIGS. 2A-C).

Figure 1C:
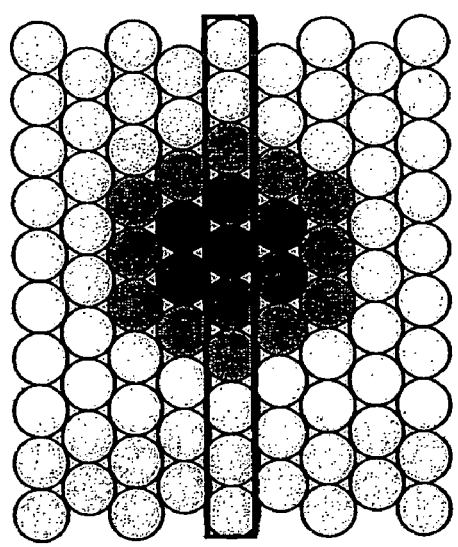
FIG. 1C is a view in a plane, P, across the proximal end of the bundle, and showing the location of a slit aperture associated with the bundle of FIG. 1B.
Figure 1D:
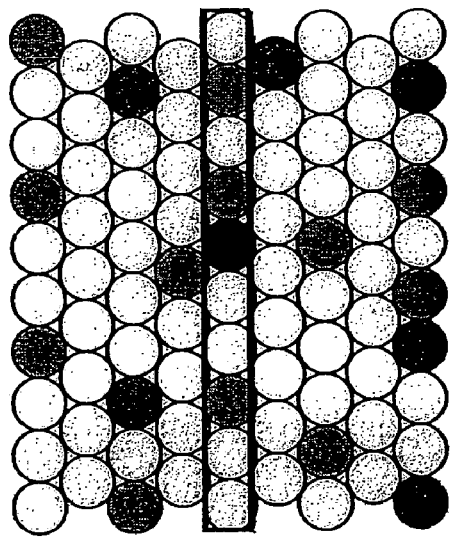
FIG. 1D is a view in the plane, D, for the fiber optic bundle of FIG. 1A when that bundle is an incoherent fiber optic bundle according to the present invention.

A confocal slit aperture placed at a plane conjugate to P and aligned with the central fiber will reject much of the unwanted light (FIG. 1C). However, a significant fraction of the unwanted light will go through the slit. This is the reason why a slit aperture does not produce the same degree of confocal rejection, as does a pinhole aperture. If the fiber bundle is now replaced by an incoherent one, then a random pattern will emerge at plane P (FIG. 1D). Rejection of unwanted light is more efficient in this case, because the fibers carrying the unwanted photons are now spatially separated, reducing the probability for these photons to pass through the slit. In FIGS. 1A to 1D, the intensity of illumination of each fiber (represented by a circle) corresponds to the darkness of the fiber. The incoherent fiber bundle provides for an arrangement (position or location) of individual fibers at its output end at D that are scrambled relative to the arrangement of the fibers at its input end at P either randomly, or in a prescribed pattern, and as such, the fiber bundle does not preserve an image captured at the input end. However, the location of each fiber of the incoherent fiber bundle at the input and output ends of the fiber may be mapped.

To form an image, the input illumination line is scanned across the plane P. The scanning can be with any suitable scan mechanism, such as a galvanometer-mounted mirror. During the scan, the output pattern at plane D is modulated in a random but deterministic fashion. On the way back, fibers carrying photons from the sample undergo reverse transformation from D to P. In general, what comes out at plane P is composed of two components—a line and scattered dots, which originate from confocal and unwanted sample planes, respectively. The line moves across the plane P in synchronism with the input scan line, while the scattered dots blink on and off in a random fashion. The former can be descanned by the same scanning mirror used for the input, allowing the confocal (in-focus) component to pass through a stationary slit aperture. The scattered dots are rejected.

Figure 2A:
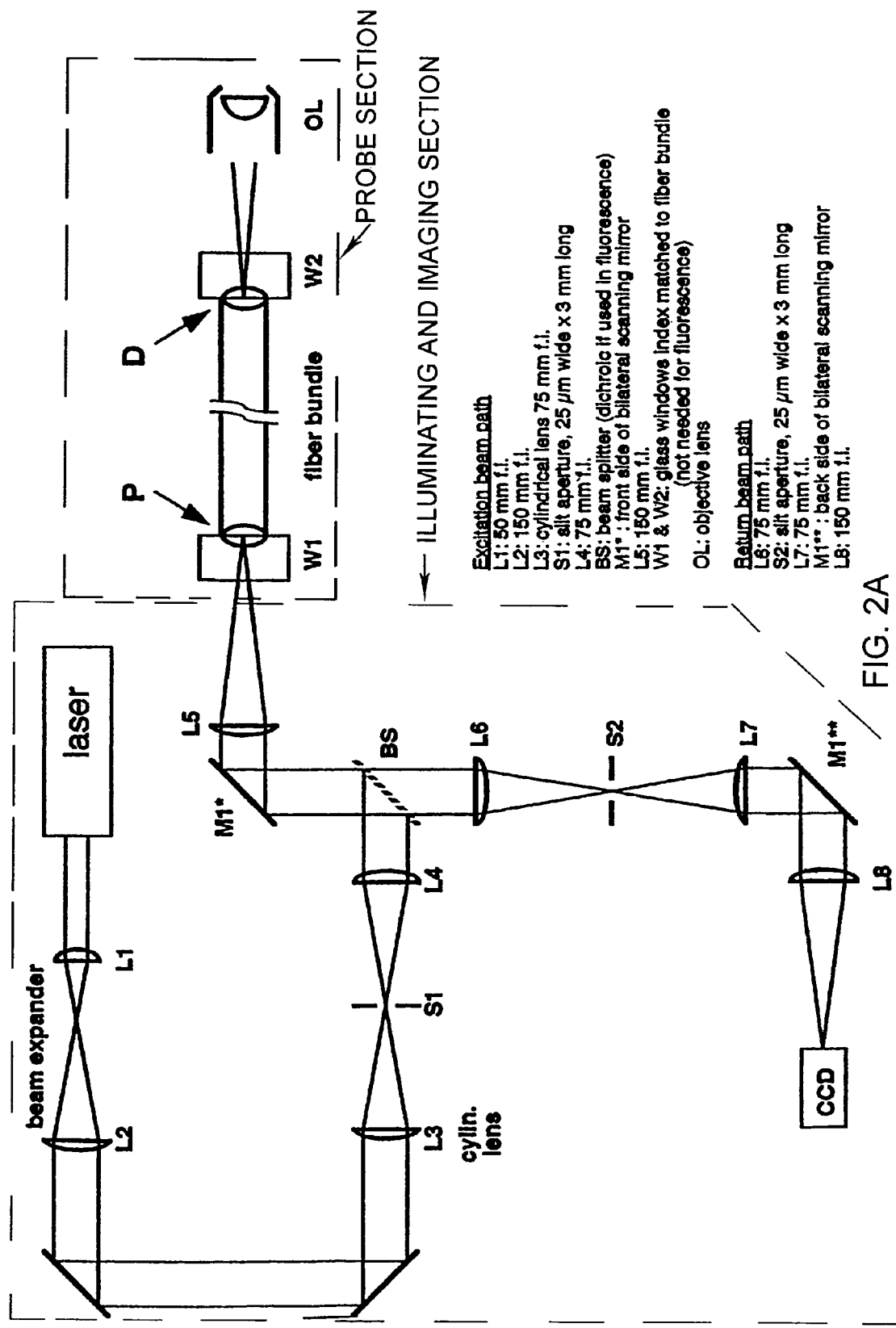
FIGS. 2A, 2B and 2C are schematic diagrams of different embodiments of confocal microscope systems embodying the invention.
Figure 2B:
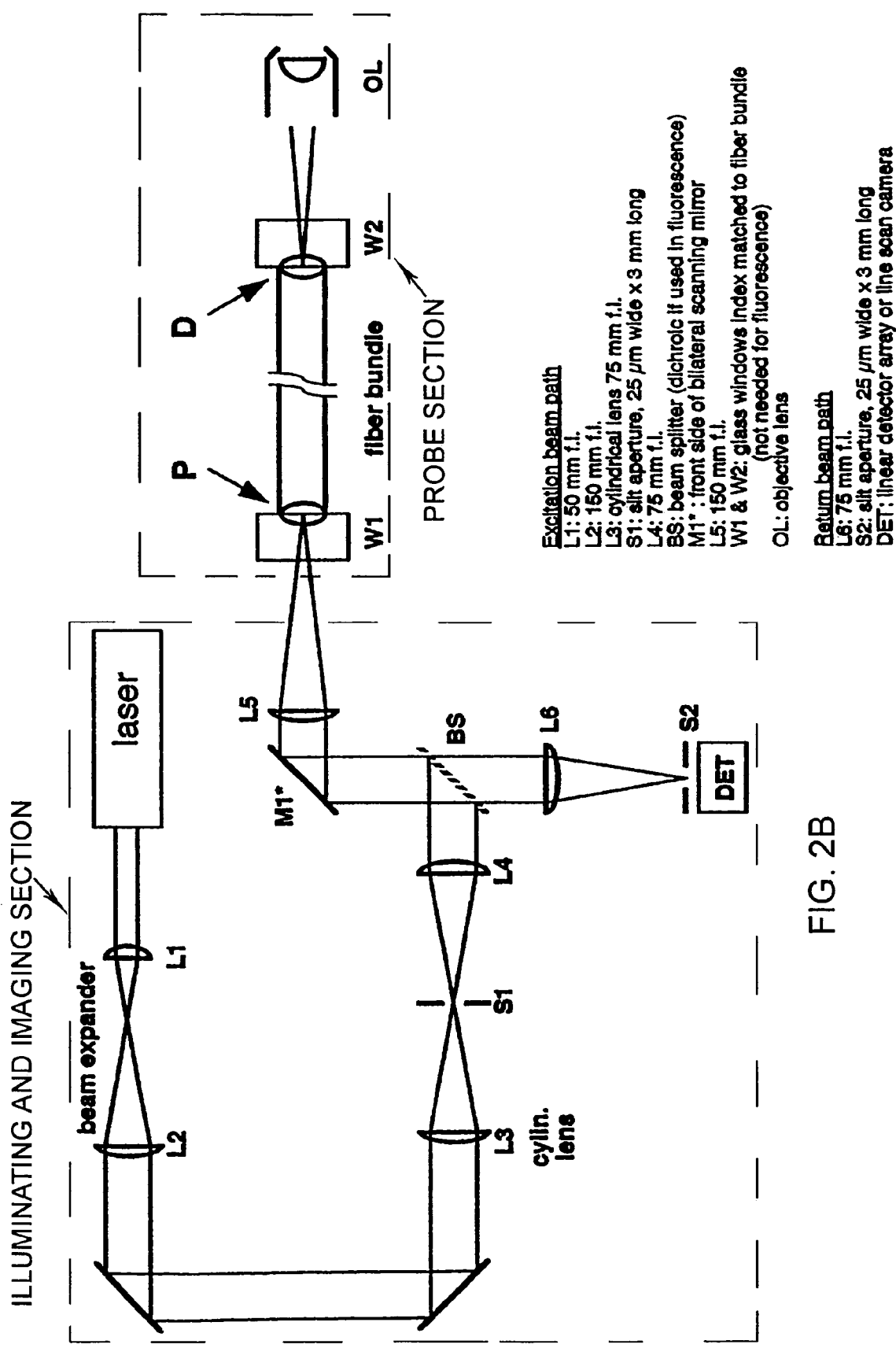
Figure 2C:
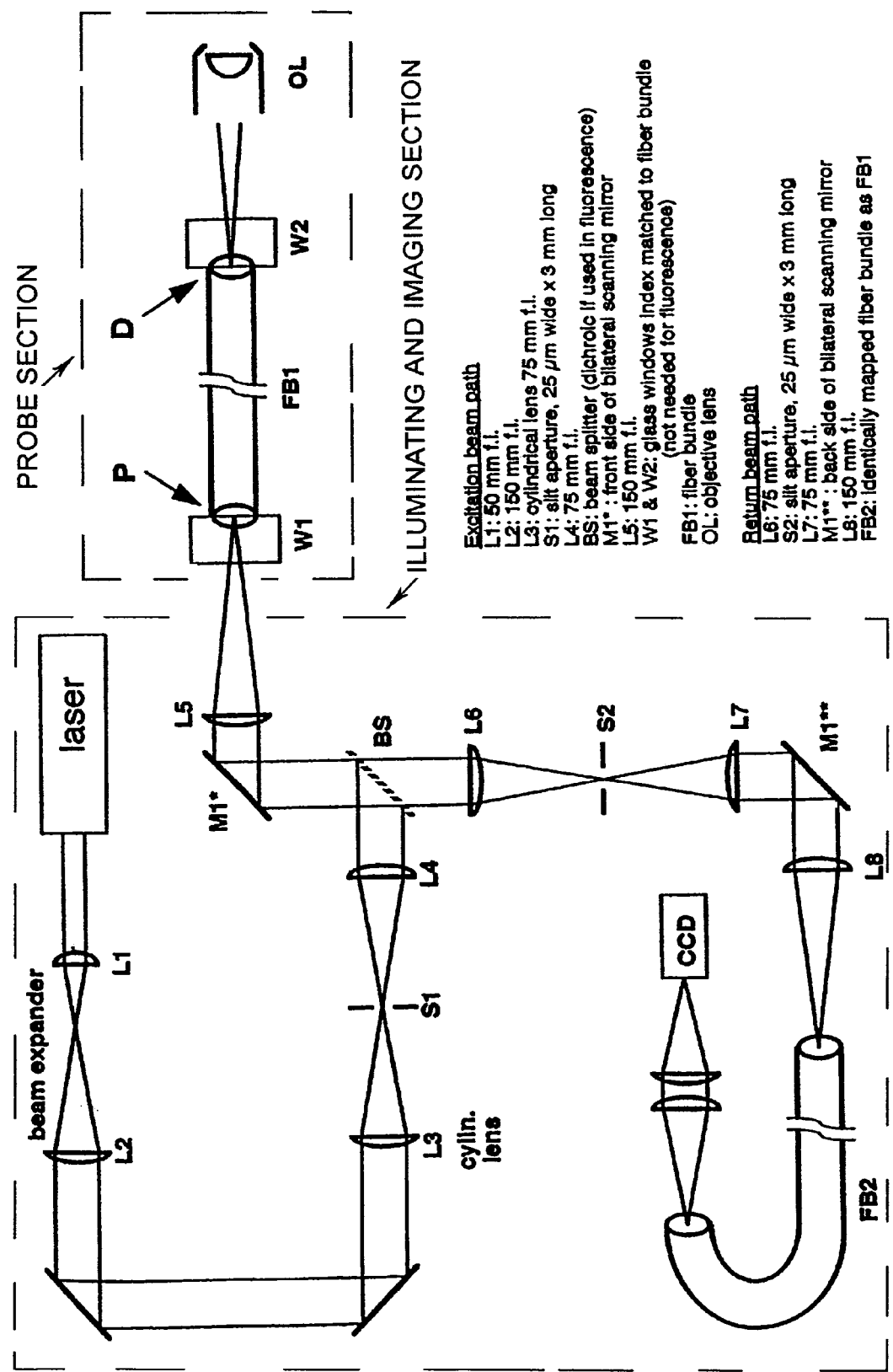

Referring to FIGS. 2A, 2B, and 2C, confocal microscopes are shown having a probe section with an incoherent fiber optic bundle FB1 and an objective lens OL and an illuminating and imaging section. Light, such as produced by a laser, illuminates the incoherent fiber optic bundle FB1 via optics having a slit aperture S1, and focused by objective lens OL to the region of interest, such as of tissue. The light collected by the lens OL from the region of interest is received by the incoherent fiber optic bundle FB1 and then imaged by onto a detector, such as a CCD camera, via optics having a confocal slit aperture S2.

The output of the stationary slit aperture rescanned onto a CCD camera yields a two-dimensional image, as is done in a bilateral scanning slit confocal microscope, in which the CCD camera provides electronic signals representative of the image to a computer (not shown). The image produced in this way, however, is not an image of the sample but a scrambled image due to the action of the incoherent bundle FB1. The original image can be reconstructed by the computer operating in accordance with decoding software if the mapping transformations of each of the fibers from D to P is known. Alternatively, the output of the slit aperture S2 can be rescanned onto an identically mapped "incoherent" bundle FB2, which reverses the scrambling done by the first bundle FB1 shown in FIG. 2C. The output of the second bundle FB2 can then be imaged onto a CCD camera. The computer may be coupled to a display, as typical of electronic imaging confocal microscopes, to view images of the region of interest.

By way of a specific example of components usable in the illustrated embodiments of the invention, is a 488 mm Ar ion laser (SpectraPhysics Model 2016). The beam expander and collimator expands and collimates the Ar laser beam to a 3 mm diameter beam by lenses L1 and L2 shown in FIG. 2. The beam is then focused by a 75 mm cylindrical lens L3 to a line illuminating a slit aperture S1 (25 µm wide by 3 mm long). A lens pair (L4 and L5) with focal lengths of 75 and 150 mm, respectively, forms a magnified image (50 µm wide by 6 mm long) of the slit at plane P, where one end of an incoherent fiber bundle FB1 is located. The fiber bundle (Edmund Scientific) FB1 maybe 30 cm long and 6.4 mm in diameter, composed of approximately 128×128 fibers with individual fiber diameter of 50 µm. The other end of the fiber bundle FB1 is placed at the back focal plane (160 mm) of a 100X, 1.25 NA oil immersion microscope objective OL. Reflections at both ends of the fiber bundle FB1 may be minimized by index-matching to 6 mm thick optical windows (not shown). The objective lens OL images individual fibers down to 0.5 µm at the sample. Reflected light from the sample is collected by the objective lens OL and coupled back into the fiber bundle FB1.

The optics of the specific embodiments are specified in Tables 1, 2 and 3 for the FIG. 2A, 2B and 2C embodiments respectively. The term "f.l." represents focal length. Note the scanning mirror M1 having front and back sides M1* and M1**, respectively, may be driven by a galvo driver, or provided by two mirrors at M1* and M1** driven synchronously, such as by a common galvo driver.

TABLE 1

Excitation beam path

L1: 50 mm f.l.
L2: 150 mm f.l.
L3: cylindrical lens 75 mm f.l.
S1: slit aperture, 25 µm wide × 3 mm long
L4: 75 mm f.l.
BS: beam splitter (dichroic if used in fluorescence)
M1*: front side of bilateral scanning mirror
L5: 150 mm f.l.
W1 & W2: glass windows index matched to fiber bundle (not needed for fluorescence)
OL: objective lens
Return beam path OL: objective lens
W1 & W2: glass windows index matched to fiber bundle (not needed for fluorescence)
L5: 150 mm f.l.
M1*: front side of bilateral scanning mirror
BS: beam splitter (dichroic if used in fluorescence)
L6: 75 mm f.l.
S2: slit aperture, 25 µm wide × 3 mm long
L7: 75 mm f.l.
M1**: back side of bilateral scanning mirror
L8: 150 mm f.l.

TABLE 2

Excitation beam path

L1: 50 mm f.l.
L2: 150 mm f.l.
L3: cylindrical lens 75 mm f.l.
S1: slit aperture, 25 µm wide × 3 mm long
L4: 75 mm f.l.
BS: beam splitter (dichroic if used in fluorescence)
M1*: front side of bilateral scanning mirror
L5: 150 mm f.l.
W1 & W2: glass windows index matched to fiber bundle (not needed for fluorescence)
OL: objective lens
Return beam path OL: objective lens
W1 & W2: glass windows index matched to fiber bundle (not needed for fluorescence)
L5: 150 mm f.l.
M1*: front side of bilateral scanning mirror
BS: beam splitter (dichroic if used in fluorescence)
L6: 75 mm f.l.
S2: slit aperture, 25 µm wide × 3 mm long
DET: linear detector array or line scan camera

TABLE 3

Excitation beam path

L1: 50 mm f.l.
L2: 150 mm f.l.
L3: cylindrical lens 75 mm f.l.
S1: slit aperture, 25 μm wide × 3 mm long
L4: 75 mm f.l.
BS: beam splitter (dichroic if used in fluorescence)
M1*: front side of bilateral scanning mirror
L5: 150 mm f.l.
W1 & W2: glass windows index matched to fiber bundle
(not needed for fluorescence)
FB1: fiber bundle
OL: objective lens Return beam path OL: objective lens
FB1: fiber bundle
W1 & W2: glass windows index matched to fiber bundle
(not needed for fluorescence)
L5: 150 mm f.l.
M1*: front side of bilateral scanning mirror
L6: 75 mm f.l.
S2: slit aperture, 25 μm wide × 3 mm long
L7: 75 mm f.l.
M1**: back side of bilateral scanning mirror
L8: 150 mm f.l.
FB2: identically mapped fiber bundle as FB1

Figure 3A:
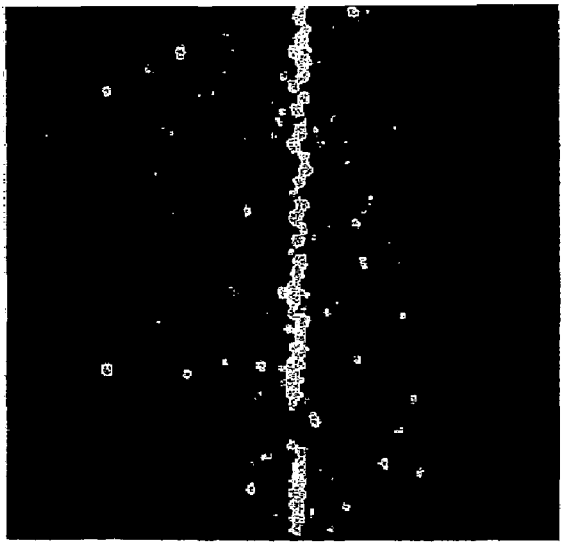
FIGS. 3A and 3B are exemplary images of the P and D ends which can be taken with the microscope of FIGS. 2A, 2B or 2C.
Figure 3B:
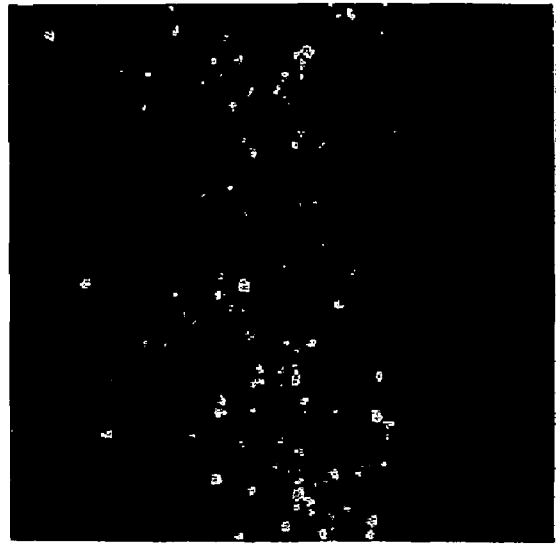

With a line input at P, the pattern of illuminated fibers at D is observed with a CCD camera. FIG. 3 shows an exemplary image of the P end of the fiber from a mirror at the position of a sample. Note that this line pattern may be color codes with colors corresponding to films in the bundle. Alternatively, the code may be a binary code of on and off illumination regions corresponding to the fibers in location. FIG. 3A is an image of the reflected light when the sample mirror was in focus. As shown, most of the reflected light is carried by fibers, which reassemble into the original slit pattern. FIG. 3B is an image at plane P of reflected light when the sample mirror was moved out of focus by ~1 μm. The brightness of the slit is greatly suppressed, while more photons emerge from the dispersed random fibers. Some of the scattered dots that appear outside the line in FIG. 3A are due to slight axial position variability. Some of the scattered dots can arise because cross talk between two adjacent fibers near the D end will appear as separate, scattered pixels at the P end, but cross-talk is also reduced at the camera, by the slit.

Figure 4:
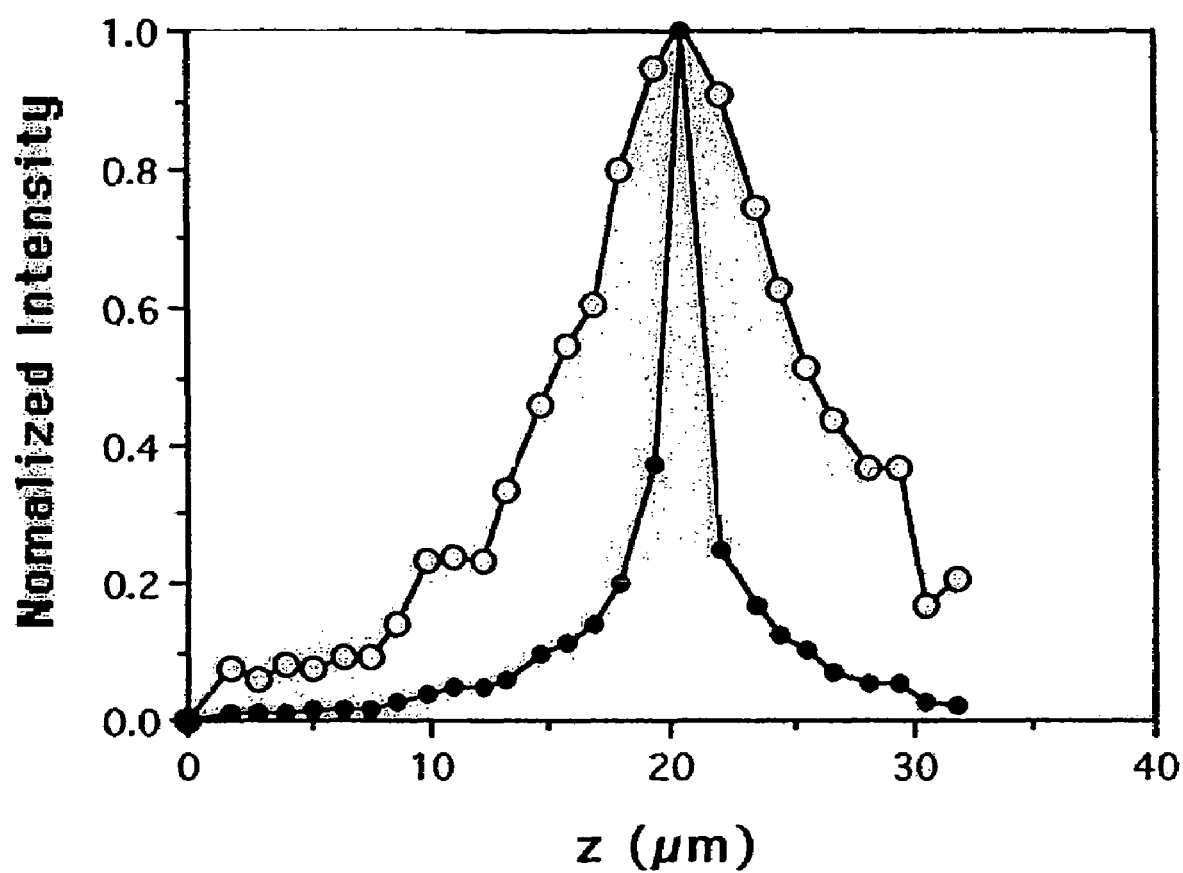
FIG. 4 are plots showing the intensity variation of the light through a confocal slit aperture (direction z) showing the discriminating effect of the incoherent bundle by the curve having the solid dots, and without the slit aperture in the curve having the open dots.

A rectangular mask over the central column of fibers digitally integrates the brightness values of the pixels captured by the CCD camera in order to provide the optical sectioning effect with a confocal slit. To show operation of the microscope, the procedure was carried out for a series of images taken as the sample mirror was stepped through the focus in ~1 μm increments. For comparison, a data set of the integrated intensities over the entire fiber bundle was taken to simulate the "wide field" case. A plot of the two data sets, individually normalized with respect to their peak values, is shown in FIG. 4 as a function of mirror position. The FWHM (full width at half maximum) of the axial response function is ~11 μm without the slit aperture and ~2 μm with the slit aperture.

The incoherent fiber bundle used in the example give above is only approximately random in that groups of nearby fibers tend to stay clustered together from one end to the other end of the bundle. Nonetheless, substantial improvement in optical sectioning is achieved with a slit aperture, as shown in FIG. 4. A bundle that scrambles in a pre-set pattern may be preferred. Then software decoding of the image does not require measurement of the fiber mapping. Such a pattern may be one that maps every row of a square matrix into a maximally separated square grid that fills a matrix of the same dimension. In terms of light budget, a fiber bundle with a high fill factor and low numerical aperture may be preferable. The low aperture minimizes light loss die to overfilling of the microscope objective entrance pupil. Additionally, a binary matrix pattern may be preferred for certain applications.

Variations and modifications in the above-described exemplary system, within the scope of the invention will become apparent to those skilled in this art. Thus, the description should not be taken in a limiting sense.

The invention claimed is:

1. A confocal microscope comprising:
    at least one probe section insertable into a subject for illuminating a region of interest thereof and including at least one flexible incoherent optical coupling element;
    an imaging section generating illumination light, and constructing images from light remitted from the region of interest;
    wherein the at least one flexible incoherent optical coupling element of the probe section transmits light between the imaging section and the probe section, and
    wherein the imaging section includes a second flexible incoherent optical coupling for descrambling light received from the probe section, whereby the confocal microscope is a remote probe for confocal imaging of tissue at locations within the subject in place of an endoscope.

2. The microscope according to claim 1 wherein said incoherent optical coupling elements are incoherent fiber optic bundles.

3. The microscope according to claim 2 wherein said imaging section comprises a line scanning means which scans across a proximal end of the element.

4. The microscope according to claim 3 further comprising a slit aperture disposed in the path of light scanned by said means across said proximal end.

5. The microscope according to claim 2 further comprising an objective lens at a distal end of said element for focusing a laser beam in said region.

6. A confocal microscope comprising:
    at least one probe section insertable into a subject having an objective lens and a first fiber bundle coupling;
    a light manipulation section including a second fiber bundle coupling; and
    wherein the first fiber bundle coupling is disposed between the light manipulation section and the objective lens and scrambles light applied to an end of said first fiber bundle, and
    wherein the second fiber bundle coupling descrambles light applied to an end thereof by said first fiber bundle, whereby the confocal microscope is a remote probe for confocal imaging of tissue at locations within the subject in place of an endoscope.

7. The microscope according to claim 6 wherein said first fiber bundle has two ends and said microscope further comprises a confocal mask at one of said ends near said manipulating section of the first fiber bundle to enhance confocality.

8. The microscope according to claim 7 wherein said confocal mask is a slit.

9. The microscope according to claim 6 wherein the first fiber bundle is not coherent in that spatially, individual fibers at one of said ends of the bundle are scrambled relative to that at the other of said ends.

10. The microscope according to claim 9 wherein said individual fibers are scrambled randomly.

11. The microscope according to claim 9 wherein said individual fibers are scrambled in a prescribed pattern.

12. The microscope according to claim 6 wherein the incident light forms a line.

13. The microscope according to claim 6 wherein said first fiber bundle has a distal end and light from the distal end of the first fiber bundle is imaged by said objective lens onto a sample, and remitted light from the sample is collected by said objective lens and coupled back into the first fiber bundle.

14. The microscope according to claim 6 in which each end of the first fiber bundle is index matched via a window material to reduce reflection from fiber ends.

* * * * *